United States Patent
Sasaki

(10) Patent No.: US 8,908,246 B2
(45) Date of Patent: Dec. 9, 2014

(54) IMAGE READING DEVICE AND METHOD FOR READING AN IMAGE WITH DUMMY INTERVAL

(75) Inventor: Atsushi Sasaki, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 146 days.

(21) Appl. No.: 13/214,982

(22) Filed: Aug. 22, 2011

(65) Prior Publication Data

US 2012/0050829 A1   Mar. 1, 2012

(30) Foreign Application Priority Data

Aug. 24, 2010  (JP) ................. 2010-186916

(51) Int. Cl.
    H04N 1/46    (2006.01)
    H04N 1/10    (2006.01)
    H04N 1/40    (2006.01)

(52) U.S. Cl.
    CPC ......... H04N 1/40056 (2013.01); H04N 1/1017 (2013.01); *H04N 2201/04767* (2013.01)
    USPC ............ 358/530; 358/501; 358/505; 358/513

(58) Field of Classification Search
    CPC .... H04N 1/00994; H04N 1/409; H04N 5/357
    USPC .................................. 358/507–513, 530–533
    See application file for complete search history.

(56) References Cited

U.S. PATENT DOCUMENTS

2002/0145675 A1* 10/2002 Yoshihara et al. ............ 348/324
2007/0055099 A1*  3/2007 Kimoto ......................... 600/109

FOREIGN PATENT DOCUMENTS

JP          05-268476 A    10/1993

* cited by examiner

*Primary Examiner* — Benny Q Tieu
*Assistant Examiner* — Marcellus Augustin
(74) *Attorney, Agent, or Firm* — Kilpatrick Townsend & Stockton LLP

(57) ABSTRACT

An image reading device has a light source and an image sensor configured to transfer an electric charge accumulated on an opto-electric conversion element to a shift register through a shift gate. A reading controller configured to control image reading inserts a dummy interval into a shift period for which the electric charge is transferred from the opto-electric conversion element so as to shift timing to start sensor reading on every line and to arrange peak positions of noise included in a read image differ from one another on every line.

6 Claims, 12 Drawing Sheets

ORDINARY CASE WHERE NO DEAD INTERVAL IS INSERTED

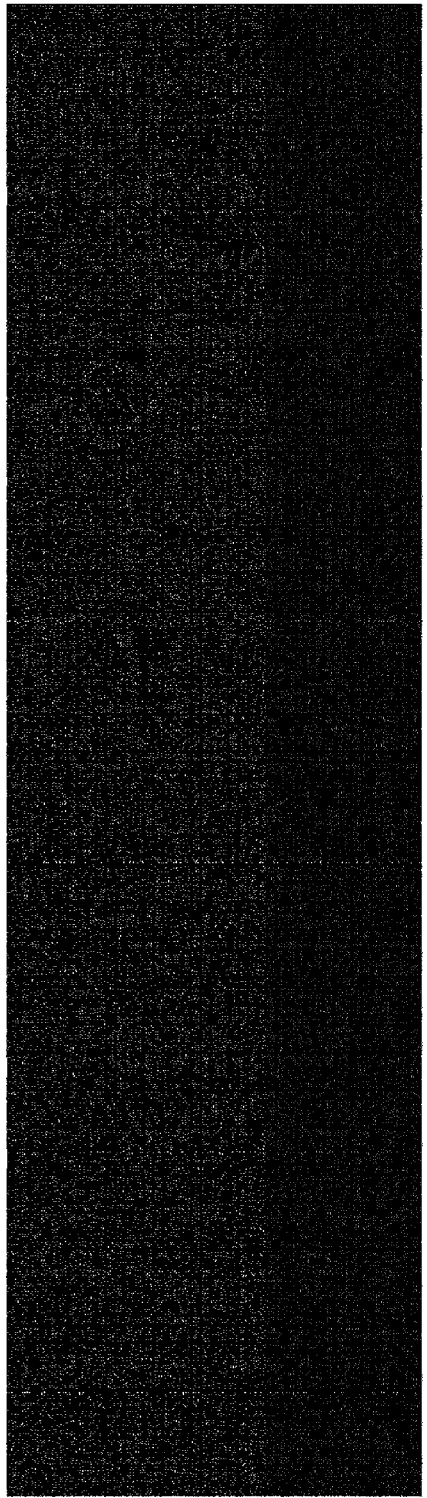

MONOCHROME 3 × 3

MONOCHROME 4 × 4

MONOCHROME 5 × 5

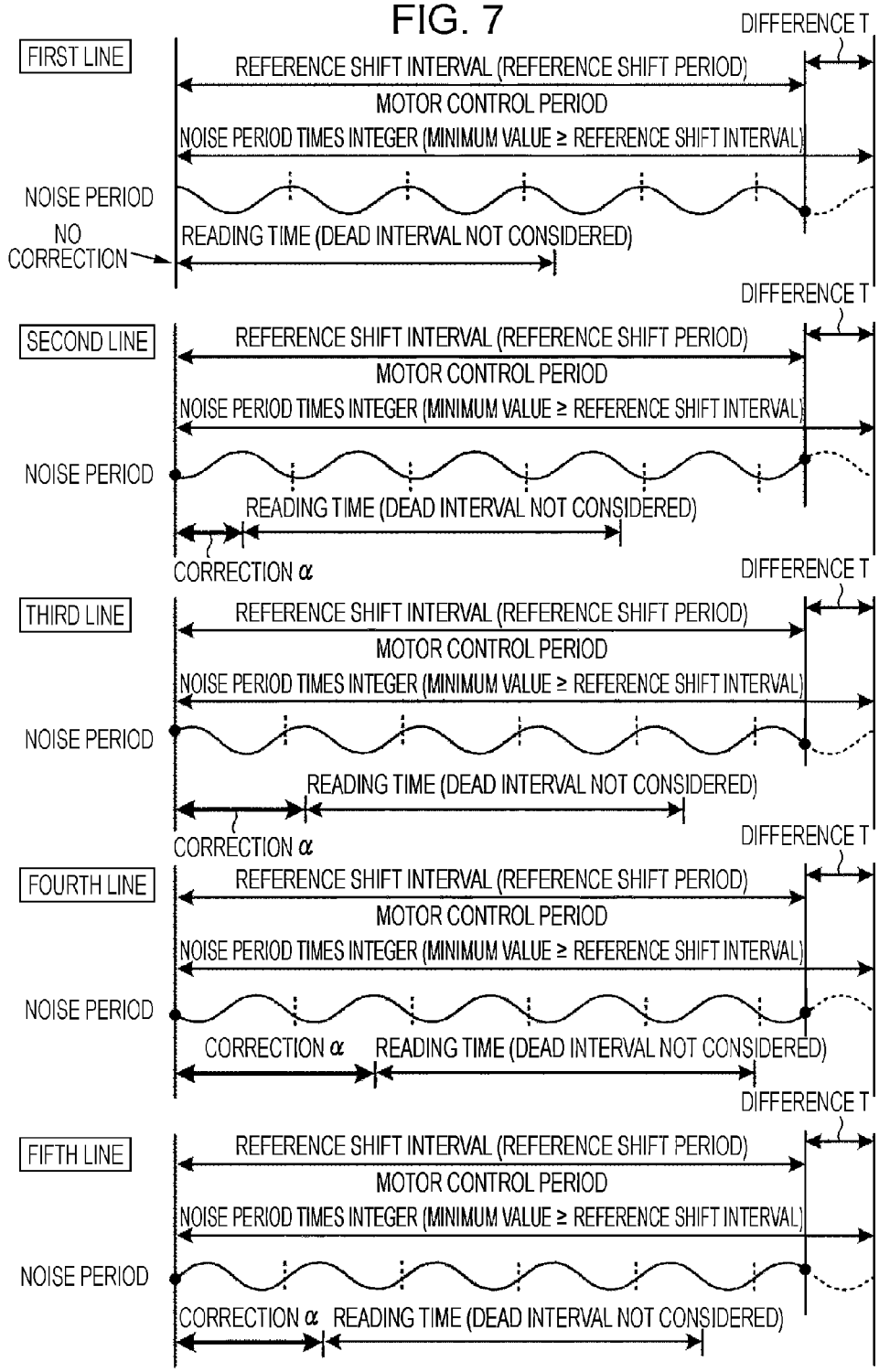

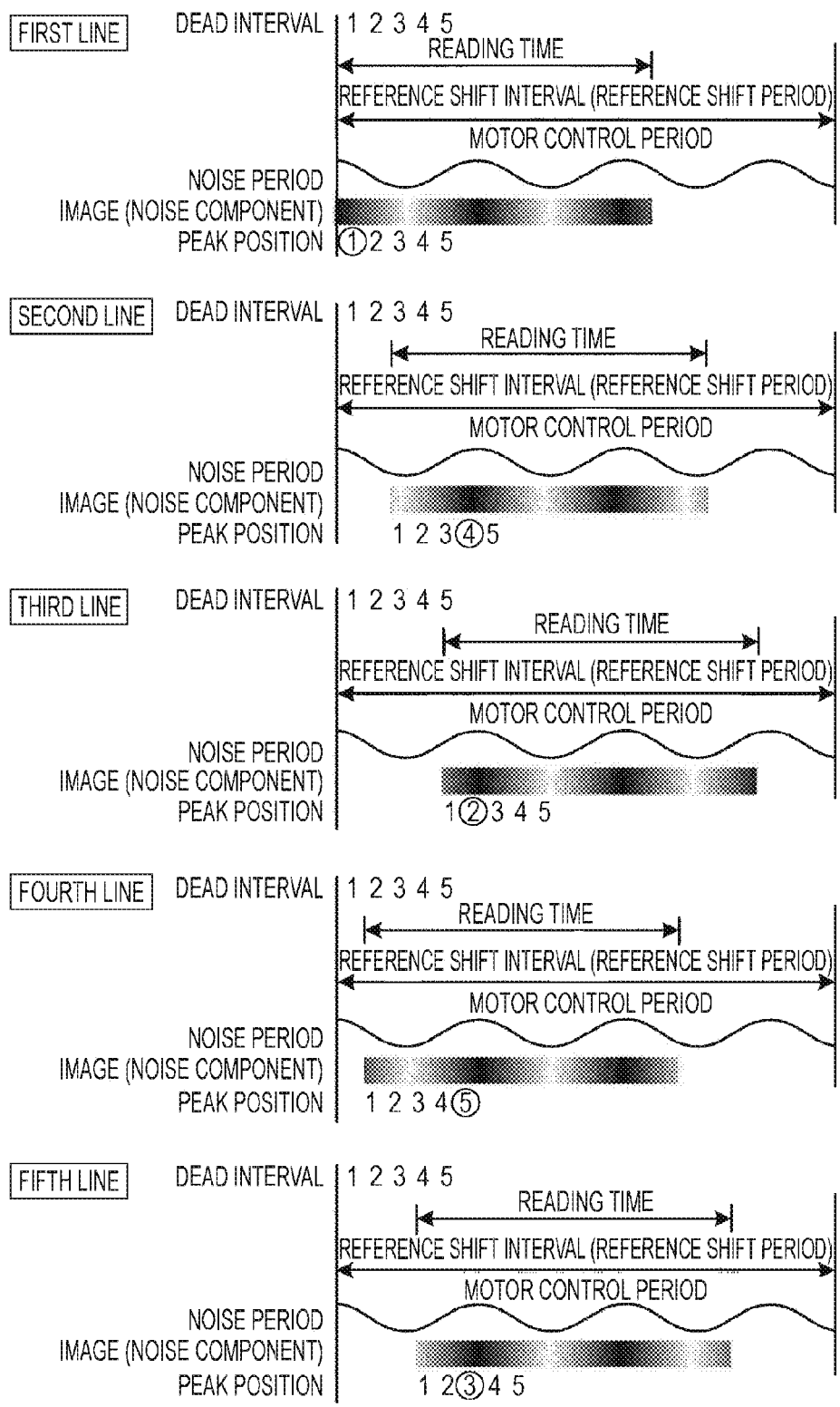

NOISE PERIOD

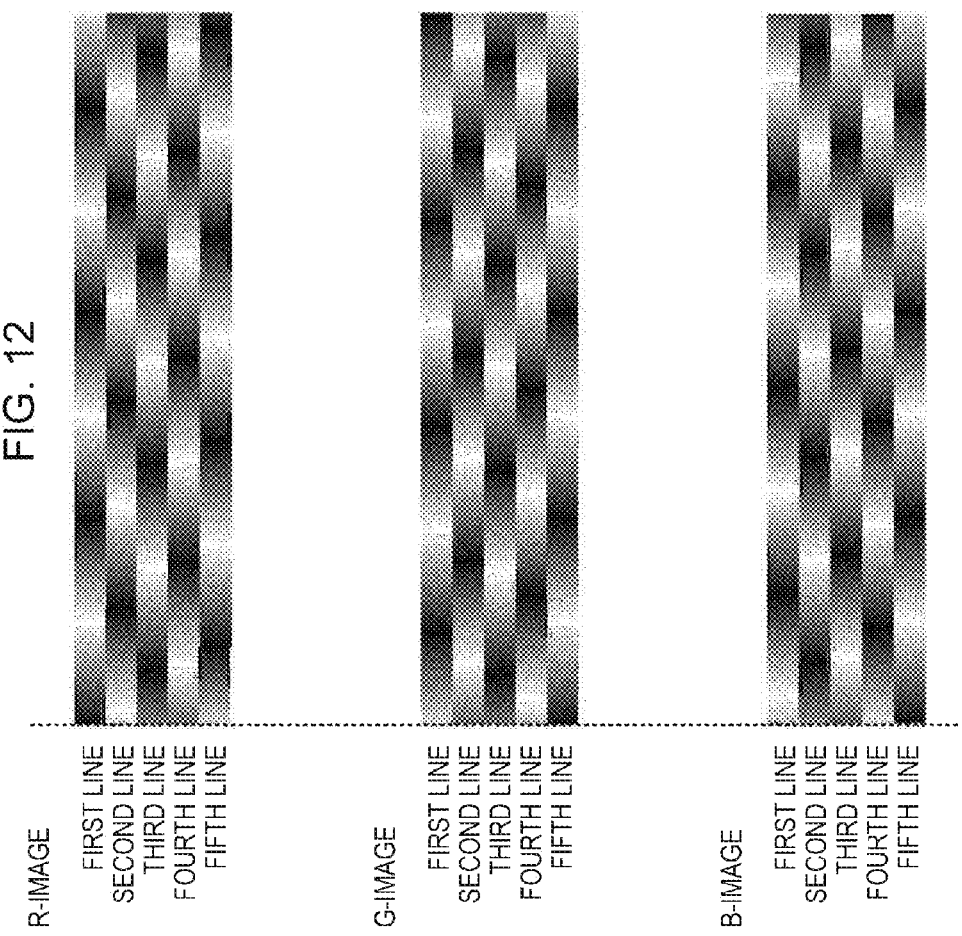

IMAGE READING DEVICE AND METHOD FOR READING AN IMAGE WITH DUMMY INTERVAL

CROSS REFERENCES TO RELATED APPLICATIONS

The entire disclosure of Japanese Patent Application No. 2010-186916, filed Aug. 24, 2010 is expressly incorporated by reference herein.

BACKGROUND

1. Technical Field

The present invention relates to an image reading device and a method for reading an image.

2. Related Art

An image reading device such as a scanner has an image sensor, and provides the image sensor with a shift pulse so as to read an image line by line, e.g., as disclosed in JP-A-5-268476.

Then, the image read by the image sensor is transferred to an A/D converter line by line, and is converted into digital data.

Incidentally, it is known that an image transferred from an image sensor to an A/D converter is mixed with noise while being transferred, and the noise that the image being transferred is mixed with has periodic intensity in some cases.

In that case, positions of intensive and weak noise (peak and bottom positions of the noise) periodically overlaid on the respective lines are lined up in a vertical direction (sub-scanning direction) of a consequently produced image, resulting in an image in which the noise draws viewers' attention.

SUMMARY

An advantage of some aspects of the invention is to provide art of reading an image by means of an image reading device in such a way that noise does not draw much attention.

According to an aspect of the invention, an image reading device has a light source, an image sensor configured to transfer an electric charge accumulated on an opto-electric conversion element to a shift register through a shift gate, and a reading controller configured to shift timing to start sensor reading on every line by inserting a dummy interval into a shift period for which the electric charge is transferred from the opto-electric conversion element, so as to arrange that a plurality of peak positions of noise included in a read image differ from one another on the respective lines.

BRIEF DESCRIPTION OF THE DRAWINGS

The invention will be described with reference to the accompanying drawings, wherein like numbers reference like elements.

FIG. 4 illustrates entire image data read through the process explained with reference to FIG. 3A.

FIG. 7 illustrates an offset correction.

FIG. 8 illustrates timing of a shift pulse outputted by the reading controller at a step S104 by the use of Ex. 1 in FIG. 6C.

FIG. 12 illustrates intensity of noise overlaid on fist to fifth lines for every color in a case where a color image is read.

DESCRIPTION OF EXEMPLARY EMBODIMENTS

An embodiment of the invention will be explained with reference to the drawings.

Figure 1:
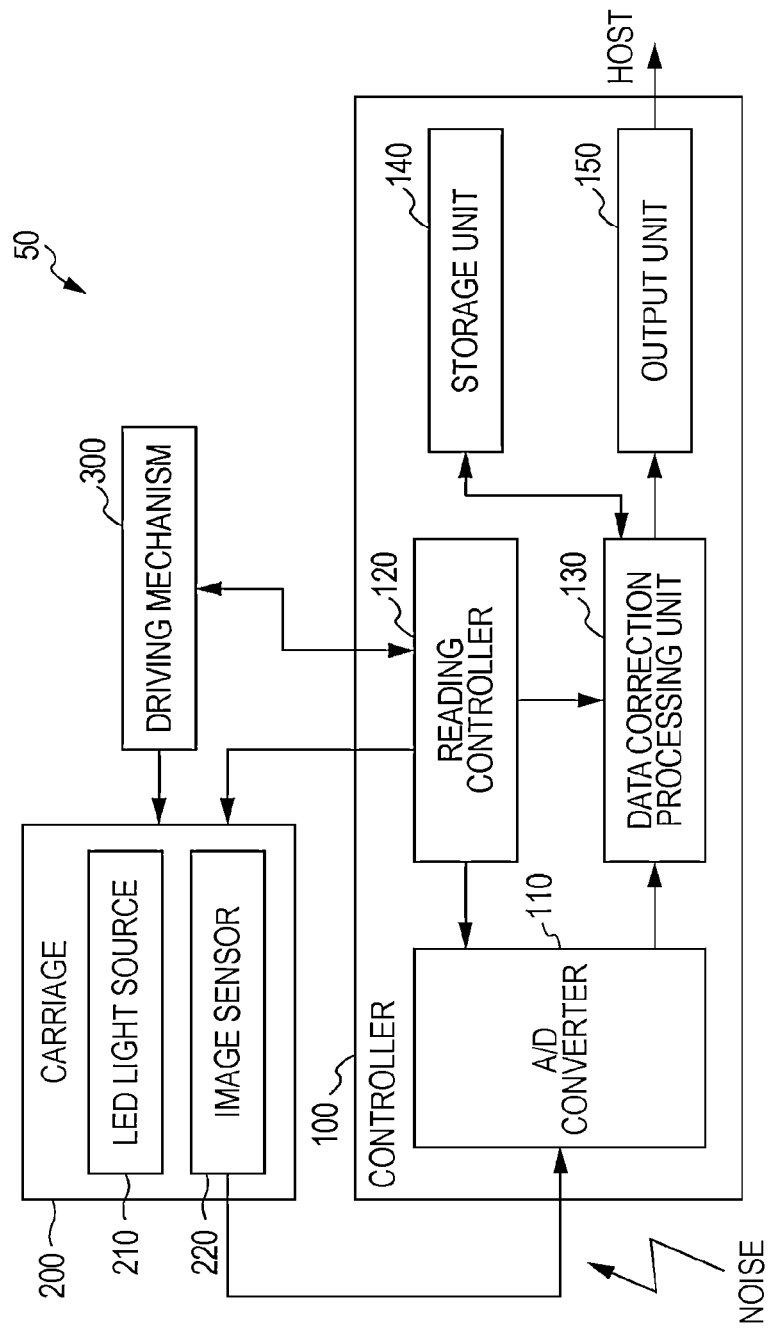
FIG. 1 is a block diagram which schematically shows an exemplary structure of an image reading device of the invention.

FIG. 1 is a block diagram which schematically shows a structure of an image reading device 50 that an embodiment of the invention is applied to.

The image reading device 50 is an image reading device of a so-called flatbed type having a document holder (not shown) on an upper face of a housing structure. The image reading device 50 scans an image sensor (solid-state imaging sensor) 220 so as to read an image of a document put on the document holder of a transparent plate.

As shown in FIG. 1, the image reading device 50 has a carriage 200 equipped with an LED light source 210 and an image sensor 220, a driving mechanism 300 which controls a move of the carriage 200, and a controller 100 which controls the entire image reading device 50 and carries out various processes so as to read an image.

The carriage 200 carries the image sensor 220 with the LED light source 210 in a sub-scanning direction. The carriage 200 is movably engaged with a shaft, etc., for guidance being parallel to a flat face of the document holder. The carriage 200 is pulled by a belt rotated by a motor (e.g., a DC motor) of the driving mechanism 300. How far the carriage 200 moves is controlled by an output value of an encoder which outputs a pulse in accordance with the number of rotations of the motor of the driving mechanism 300.

The LED light source 210 is formed by a red (R) LED, a green (G) LED and a blue (B) LED. The LED light source 210 sequentially emits RGB three-color light in specific order in order that a color image is read. The red LED, the green LED and the blue LED of the LED light source 210 of the embodiment sequentially emit light in this order in order that one line of an ordinary document is read. Then, the LED light source 210 similarly and repeatedly emits light so that lines as many as required for production of an image of the document are read. A period of time for which the LED of each of the colors emits light is fixed in advance. The LED is turned on, and then turned off after the fixed period of time passes. Incidentally, the order of light emission for reading one line is not limited to the order of RGB.

Incidentally, when a monochrome image is read, the red LED, the green LED and the blue LED of the LED light source 210 emit light at the same time in order that one line of a document is ordinarily read.

The image sensor 220 accepts light reflected by the document, accumulates electric charges in accordance with an amount of the accepted light and sends the accumulated electric charges to the controller 100 as read image data (an electric signal).

The image sensor 220 is formed by a plurality of sensor chips lined up in a main scanning direction. The sensor chips each have portions similar to those of an ordinary CIS (Contact Image Sensor) or a CCD (Charge Coupled Device) image sensor. That is, each of the sensor chips has an opto-electric conversion element (photodiode), a shift gate and a shift register. Then, the sensor chip opens the shift gate and transfers electric charges accumulated on the opto-electric conversion element to the shift register, and sequentially moves and outputs the electric charges by means of the shift register.

The sensor chip opens the shift gate (transfers the electric charges) in response to an applied shift pulse (a signal coming from a reading controller 120 described later). As the opto-electric conversion element usually accumulates electric charges in accordance with an amount of accepted light, timing to transfer the electric charges to the shift register equals timing to start to accumulate electric charges of a next color. The electric charges transferred to the shift register are converted to an electric signal (analog data), and is sent from an output port at the end of the shift register to an A/D converter 110 described later.

The shift register outputs the electric charges stored therein in response to a specific reading clock signal (a signal coming from the reading controller 120 described later). Electric charges of one pixel, e.g., are outputted as analog data every one clock pulse.

Incidentally, as generally known, the electric signal outputted from the shift register is mixed with noise while being transferred to the A/D converter 110. Intensity of the noise that the electric signal is mixed with periodically changes as time passes. Positions where the noise is made most intensive and weakest are called a "peak position" and a "bottom position", respectively hereafter. Further, a period of an intensity cycle of noise (e.g., a period of time between a peak position and a next peak position of the noise) is called a "noise period".

The controller 100 has the A/D converter 110 which carries out an analog process (e.g., converts analog data outputted from the image sensor 220 into digital data), a data correction processing unit 130 which variously corrects the digital data outputted from the A/D converter 110, a storage unit 140 in which digital data (e.g., white reference data or black reference data) to be used by the data correction processing unit 130 for various corrections is stored, an output unit 150 for sending data coming from the data correction processing unit 130 to a host such as a personal computer, and the reading controller 120 which controls the entire functional portions in the controller 100 and controls the LED light source 210 and the image sensor 220 in the carriage 200 and the driving mechanism 300.

The reading controller 120 controls a move of the carriage 200 by controlling rotations of the motor of the driving mechanism 300.

Further, the reading controller 120 controls the image sensor 220 reading an image.

To put it specifically, the reading controller 120 periodically provides the image sensor 220 with a shift pulse, and controls timing to transfer electric charges accumulated on the opto-electric conversion element to the shift register (timing to start to accumulate electric charges next time). Incidentally, a period of time (interval) between two consecutive shift pulses with which the image sensor 220 is provided is called a "shift period" hereafter. Further, the timing to transfer electric charges accumulated on the opto-electric conversion element to the shift register is called "timing to start sensor reading" as well, hereafter.

Further, the reading controller 120 provides the image sensor 220 with a reading clock signal, and controls output of the electric charges stored in the shift register to the A/D converter 110.

Further, the reading controller 120 is synchronized with reading operation of the image sensor 220 so as to control the LED light source 210 turned on or off.

Incidentally, as described above, the intensity of noise that the electric signal (read image) transferred from the shift register to the A/D converter 110 periodically changes as time passes. Thus, positions of intensive and weak noise (peak and bottom positions) periodically overlaid on the respective lines are each lined up in the vertical direction (sub-scanning direction) of an image consequently produced by the controller 100, resulting in an image in which the noise draws viewers' attention.

Figure 2:
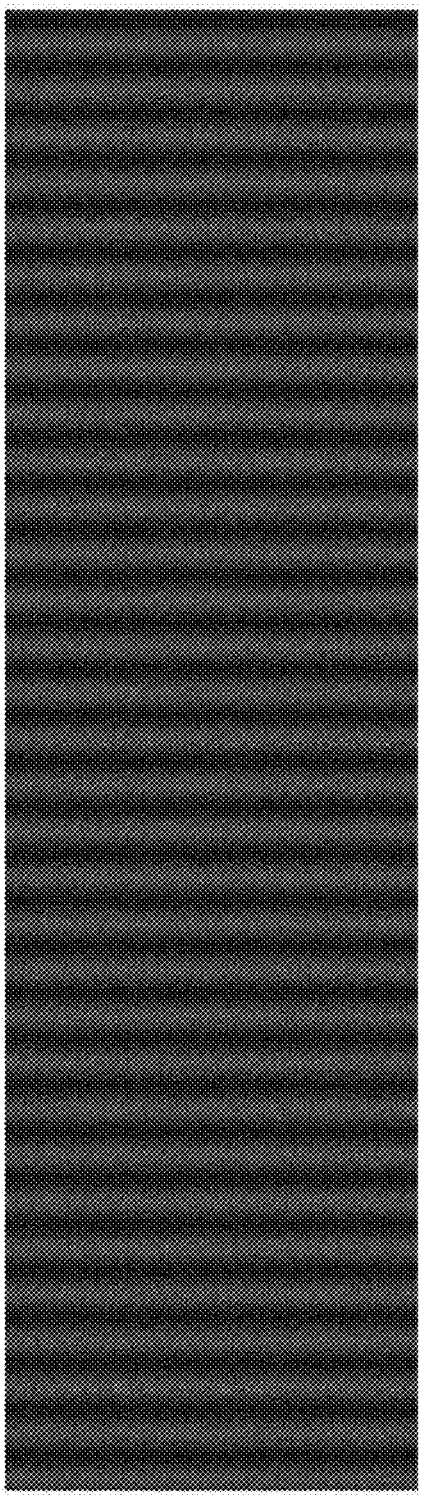
FIG. 2 illustrates entire image data produced by the use of an ordinary method.

FIG. 2 entirely shows image data produced by the use of an ordinary method. As shown in FIG. 2, positions of intensive and weak noise (peak and bottom positions) that the image data is mixed with are each lined up across the respective lines, resulting in that the noise that the image data is mixed with draws users' attention.

Thus, according to the application, the reading controller 120 inserts a dummy interval into a shift period, so as to shift the timing to start sensor reading line by line. The peak (or bottom) positions of the noise included in the image data consequently produced by the controller 100 thereby vary line by line.

Figure 3A:
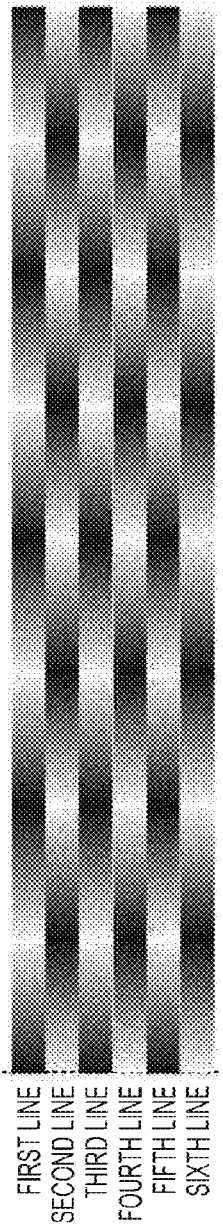
FIG. 3A illustrates an exemplary process for inserting a dummy interval into a shift period in a case where a monochrome image is read.

FIG. 3A illustrates an exemplary process for inserting a dummy interval into a shift period in a case where a monochrome image is read. As shown in FIG. 3A, e.g., the reading controller 120 inserts no dummy interval into a shift period when reading the image on an odd-numbered line, and inserts a dummy interval into a shift period when reading the image on an even-numbered line. Noise peak positions thereby come to front positions (where to start sensor reading) of image data on the respective odd-numbered lines, and noise bottom positions come to front positions (where to start sensor reading) of image data on the respective even-numbered lines.

Figure 3B:
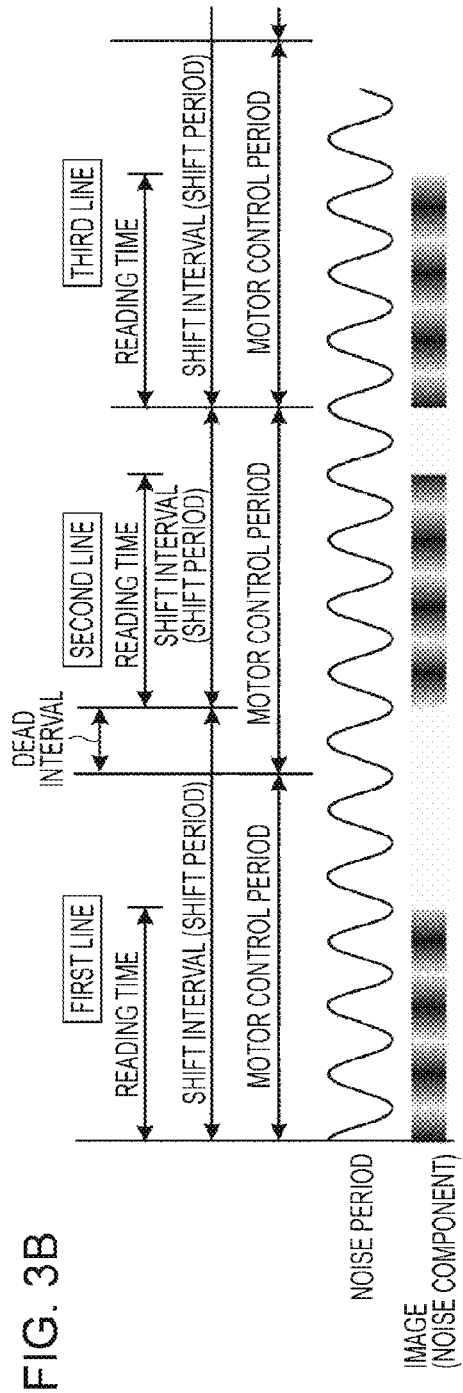
FIG. 3B illustrates intensity of noise overlaid on first to sixth lines in a case where a monochrome image is read through the process explained with reference to FIG. 3A.

FIG. 3B illustrates intensity of the noise that the image data is mixed with on the first through sixth lines in a case where the image is read by means of the process explained with reference to FIG. 3A. The intensity of the noise is indicated by light and shade in black. As to the image data read by means of the process explained with reference to FIG. 3A, as shown in FIG. 3B, the noise peak positions come to the front positions on the odd-numbered (first, third and fifth) lines, and the noise bottom positions come to the front positions on the even-numbered (second, fourth and sixth) lines.

FIG. 4 illustrates the entire image data read by means of the process explained with reference to FIG. 3A. According to a method of the application, as shown in FIG. 4, the intensive and weak (peak and bottom) positions of the noise that the image data is mixed with are rendered uneven across the respective lines. Thus, the noise that the image data is mixed with draws not as much attention as usual from a user.

Return to FIG. 1. The A/D converter 110 is formed by an IC (so-called analog frontend IC). The A/D converter 110 converts (quantizes) inputted analog data into digital data, and outputs the digital data to the data correction processing unit 130.

The data correction processing unit 130 corrects the digital data outputted by the A/D converter 110 in various ways such as a shading correction, and outputs the corrected data to the output unit 150.

The storage unit 140 is implemented by a memory, etc., in which data to be used by the data correction processing unit 130 for various correction processes is stored. White reference data or black reference data to be used for a shading correction, e.g., is stored in the storage unit 140.

The output unit 150 is provided with an interface for a network or USB connection. The output unit 150 transmits digital data outputted by the data correction processing unit 130 to a host computer.

The main portions of the controller 100 described above can be implemented by an ordinary computer provided with a CPU which is an arithmetic operation device, a ROM in which a program, etc. is recorded, a RAM being a main memory in which data, etc. is temporarily stored, an interface which controls inputs and outputs from and to a host, etc., and a system bus being a communication channel among the respective portions. The controller 100 may be formed by including an ASIC (Application Specific Integrated Circuit) designed for exclusive use of a particular process, or may be formed by an ASIC.

The image reading device 50 that the embodiment is applied to is formed by the portions described above. The portions described above are typical main portions needed for explanation of a feature of the invention, and the image reading device 50 is not limited to having the above portions. Further, another portion that an ordinary image reading device is provided with is not excluded. Further, the image reading device 50 may be a multifunction printer having a printer or facsimile function as well. Further, the A/D converter 110 may be mounted on a printed board in the carriage 200.

Further, the respective portions described above are classified in accordance with what is mainly processed by those portions so that how the image reading device 50 is formed can be easily understood. The invention is not limited depending upon how the portions are classified or what the portions are named. The portions of the image reading device 50 can be broken into further more portions in accordance with what is processed. Further, one of the portions can be classified as what carries out further more processes. Further, the portions each can carry out a process by means of one hardware component or plural hardware components.

Then, an operation peculiar to the image reading device 50 formed as described above will be explained.

<Image Reading Process (Monochrome Image)>

Figure 5:
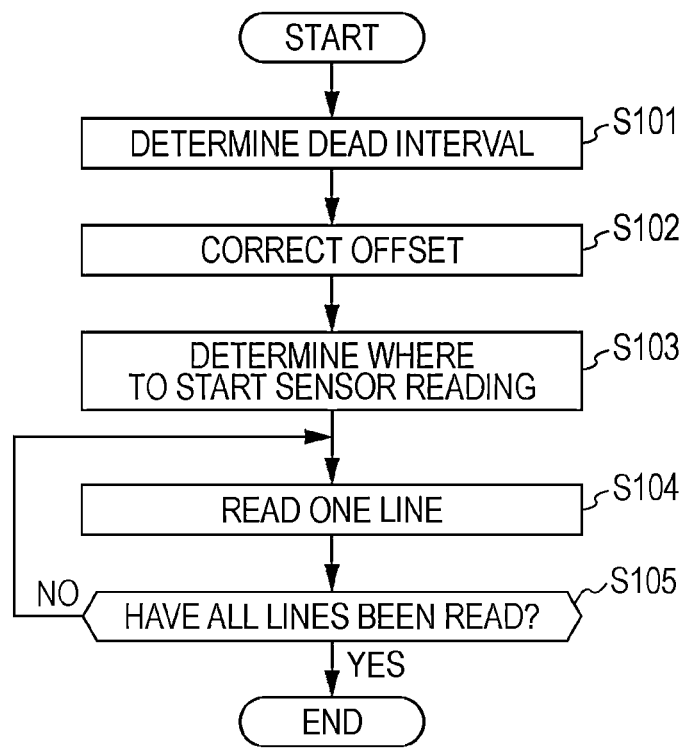
FIG. 5 is a flowchart for illustrating an exemplary image reading process carried out by the image reading device.

FIG. 5 is a flowchart for explaining an exemplary image reading process carried out by the image reading device 50 of the embodiment. The flow represents an image reading process for reading a monochrome image.

Upon accepting an instruction, e.g., to start to read a document, the reading controller 120 starts the flow.

Upon starting the flow, the reading controller 120 determines a dummy interval to be inserted into a shift period as described above (step S101). Incidentally, the case explained above was where a dummy interval is inserted when the image is read on an even-numbered line, and the flow explained here represents another case.

The reading controller 120 divides a noise period into a plurality of intervals at the step S101, and arranges that intervals in which noise peak (or bottom) positions are included differ from one another on respective lines each formed by the consecutive intervals into which the noise period is divided.

Figure 6A:
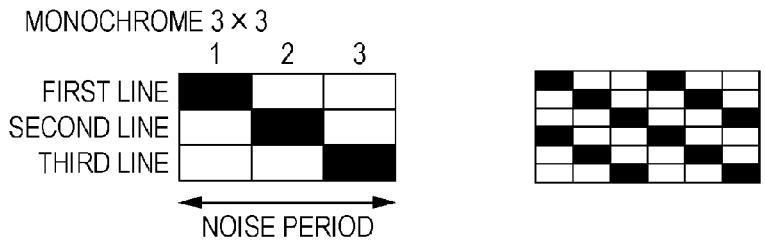
FIG. 6A illustrates, on the left, noise peak positions on respective lines in a case where the noise period is divided into three intervals, and illustrates on the right peak positions in a case where four or more lines are read.

FIG. 6A illustrates, on its left hand side, noise peak positions on the respective lines in a case where the noise period is divided into three intervals. Incidentally, cells painted black represent intervals in which noise peak positions are included.

If the noise period is divided into three intervals as shown there, the reading controller 120 arranges that the intervals in which noise peak (or bottom) positions are included differ from one another on the consecutive three lines. In order to read a first one of the three consecutive lines, e.g., the reading controller 120 determines a dummy interval so that a noise peak position comes to a first one of the intervals into which the noise period is divided by three. Further, in order to read a second one of the three consecutive lines, the reading controller 120 determines a dummy interval so that a noise peak position comes to a second one of the intervals into which the noise period is divided by three. Further, in order to read a third one of the three consecutive lines, the reading controller 120 determines a dummy interval so that a noise peak position comes to a third one of the intervals into which the noise period is divided by three.

If the dummy intervals determined in this way are inserted into the shift periods, the noise peak positions are rendered uneven across the three consecutive lines, and a noise component included in consequently produced image data can thereby be suppressed so as not to draw much attention.

If four or more lines are read as shown on a right hand side in FIG. 6A, the reading controller 120 repeatedly carries out the above process for three lines (to determine the dummy intervals).

Figure 6B:
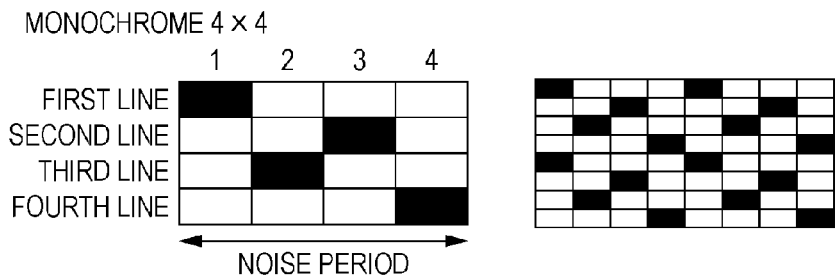
FIG. 6B illustrates, on the left, noise peak positions on respective lines in a case where the noise period is divided into four intervals, and illustrates on the right peak positions in a case where five or more lines are read.

Further, FIG. 6B shows, on its left hand side, noise peak positions on respective lines in a case where the noise period is divided into four intervals.

If the noise period is divided into four intervals as shown there, the reading controller 120 arranges that the intervals in which noise peak (or bottom) positions are included differ from one another on the consecutive four lines. In order to read a first one of the four consecutive lines, e.g., the reading controller 120 determines a dummy interval so that a noise peak position comes to a first one of the intervals into which the noise period is divided by four. Further, in order to read a second one of the four consecutive lines, the reading controller 120 determines a dummy interval so that a noise peak position comes to a third one of the intervals into which the noise period is divided by four. Further, in order to read a third one of the four consecutive lines, the reading controller 120 determines a dummy interval so that a noise peak position comes to a second one of the intervals into which the noise period is divided by four. Further, in order to read a fourth one of the four consecutive lines, the reading controller 120 determines a dummy interval so that a noise peak position comes to a fourth one of the intervals into which the noise period is divided by four.

If the dummy intervals determined in this way are inserted into the shift periods, the noise peak positions are rendered uneven across the four consecutive lines, and a noise component included in consequently produced image data can thereby be suppressed so as not to draw much attention.

If five or more lines are read as shown on a right hand side in FIG. 6B, the reading controller 120 repeatedly carries out the above process for four lines (to determine the dummy intervals).

Figure 6C:
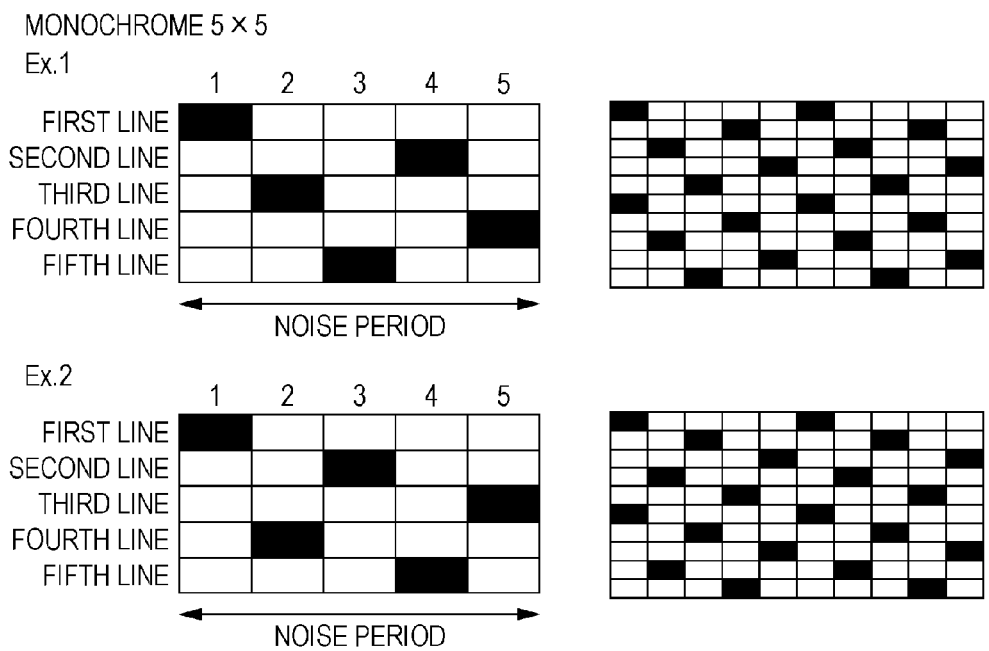
FIG. 6C illustrates, on the left, noise peak positions on respective lines in a case where the noise period is divided into five intervals, and illustrates on the right peak positions in a case where six or more lines are read.

Further, FIG. 6C illustrates, on its left hand side, noise peak positions on respective lines in a case where the noise period is divided into five intervals.

If the noise period is divided into five intervals as shown as Ex. 1, the reading controller 120 arranges that the intervals in which noise peak (or bottom) positions are included differ from one another on the consecutive five lines. In order to read a first one of the five consecutive lines, e.g., the reading controller 120 determines a dummy interval so that a noise peak position comes to a first one of the intervals into which the noise period is divided by five. Further, in order to read a second one of the five consecutive lines, the reading controller 120 determines a dummy interval so that a noise peak position comes to a fourth one of the intervals into which the noise period is divided by five. Further, in order to read a third one of the five consecutive lines, the reading controller 120 determines a dummy interval so that a noise peak position comes to a second one of the intervals into which the noise period is divided by five. Further, in order to read a fourth one of the five consecutive lines, the reading controller 120 determines a dummy interval so that a noise peak position comes to a fifth one of the intervals into which the noise period is divided by five. Further, in order to read a fifth one of the five consecutive lines, the reading controller 120 determines a dummy interval so that a noise peak position comes to a third one of the intervals into which the noise period is divided by five.

Still another example is shown as Ex. 2 such that, in order to read a first one of the five consecutive lines, e.g., the reading controller 120 determines a dummy interval so that a noise peak position comes to a first one of the intervals into which the noise period is divided by five. Further, in order to read a second one of the five consecutive lines, the reading controller 120 determines a dummy interval so that a noise peak position comes to a third one of the intervals into which the noise period is divided by five. Further, in order to read a third one of the five consecutive lines, the reading controller 120 determines a dummy interval so that a noise peak position comes to a fifth one of the intervals into which the noise period is divided by five. Further, in order to read a fourth one of the five consecutive lines, the reading controller 120 determines a dummy interval so that a noise peak position comes to a second one of the intervals into which the noise period is divided by five. Further, in order to read a fifth one of the five consecutive lines, the reading controller 120 determines a dummy interval so that a noise peak position comes to a fourth one of the intervals into which the noise period is divided by five.

If the dummy intervals determined in this way, shown as either Ex. 1 or EX. 2, are inserted into the shift periods, the noise peak positions are rendered uneven across the five consecutive lines, and a noise component included in consequently produced image data can thereby be suppressed so as not to draw much attention.

If six or more lines are read as shown on a right hand side in FIG. 6C, the reading controller 120 repeatedly carries out the above process for five lines (to determine the dummy intervals).

The reading controller 120 determines a dummy interval to be inserted into a shift period on every line as described above. Although the examples described above are such that a noise period is divided into three, four or five intervals, the invention is not limited to those examples. Further, as the number of intervals into which a noise period is divided increases, noise peak positions are likely to be rendered uneven across the respective lines, and a noise component included in consequently produced image data can thereby be suppressed more so as not to draw much attention. A noise period should preferably be divided into five or more intervals if possible.

Then, the reading controller 120 shifts the process to a step S102, so as to make an offset correction (step S102). The term offset correction mentioned here means a correction for rendering noise peak positions even across respective lines before inserting dummy intervals into shift periods.

FIG. 7 illustrates an offset correction. As shown there, e.g., the reading controller 120 determines a time length (correction a) by which the position to start sensor reading is shifted on every line so that phases of noise overlaid on the front positions (to start sensor reading) of the respective lines agree with one another.

The reading controller 120 specifically determines the correction $\alpha$ in accordance with Equation (1), i.e., "correction $\alpha(k)$=correction $\alpha(k-1)$ on the previous line+(difference T)".

Incidentally, the variable "k" is an integer indicating turns of the lines to be read. Further, the variable "T" indicates a difference between a value which is the noise period times an integer and is minimum but not smaller than a shift period determined before insertion of a dummy interval (called the "reference shift period (interval)" hereafter) and the reference shift period.

The examples shown in FIG. 7 will be explained. As to a correction $\alpha(1)$ on the first line, the reading controller 120 lets "correction $\alpha(1)$=0", and subtracts the reference shift period from a value which is the noise period times an integer and is minimum but not smaller than the reference shift period so as to calculate a "difference T".

As to a correction $\alpha(2)$ on the second line, then, the reading controller 120 determines the correction $\alpha(2)$ by using Equation (1) shown above ($\alpha(2)=\alpha(1)+T$). Further, as to corrections on the third and following lines, the reading controller 120 determines the corrections a by using Equation (1) shown above and calculating "correction $\alpha(3)$ on the third line=correction $\alpha(2)$ on the second line +T", "correction $\alpha(4)$ on the fourth line=correction $\alpha(3)$ on the third line +T", and "correction $\alpha(5)$ on the fifth line=correction $\alpha(4)$ on the fourth line +T".

If the correction $\alpha$ turns equal to or greater than the noise period (correction $\alpha$>=noise period), however, the reading controller 120 determines the correction $\alpha$ in accordance with Equation (2), i.e., "correction $\alpha(k)$=correction $\alpha(k-1)$ on the previous line+(difference T)−noise period". As shown in FIG. 7, e.g., the reading controller 120 determines the correction $\alpha$ by using Equation (2) as to the correction $\alpha(5)$ on the fifth line.

The reading controller 120 then delays starting sensor reading by the correction $\alpha$ determined as described above, so that the phases of the noise overlaid on the front positions (to start sensor reading) of the respective lines agree with one another.

Then, the reading controller 120 shifts the process to a step S103, so as to carry out a process for determining a position to start sensor reading (step S103). The reading controller 120 specifically adds the dummy interval determined at the step S5101 to the offset correction a determined at the step S102 on every line so as to determine a position to start sensor reading.

Then, the reading controller 120 controls document reading in accordance with the position to start sensor reading determined at the step S103 (step S104).

The reading controller 120 specifically provides the image sensor 220 with a shift pulse at the position (timing) to start sensor reading determined at the step S103. Incidentally, the timing when the reading controller 120 provides the image sensor 220 with a shift pulse can be measured by the use of a timer (a timing generator, etc.) provided in advance.

Further, the reading controller 120 makes red, green and blue LEDs of the LED light source 210 simultaneously emit light for a certain period of time, in synchronization with the reading operation of the image sensor 220.

Further, the reading controller 120 provides the image sensor 220 with a reading clock signal, and makes the image sensor 220 output the electric charges stored in the shift register to the A/D converter 110.

Then, an electric signal outputted from the shift register is mixed with noise, whose intensity periodically changes, while being transferred to the A/D converter 110.

Then, the A/D converter 110 extracts a component corresponding to "reading time" determined in advance from the electric signal transferred from the shift register, converts the extracted component into digital data and outputs the digital data to the data correction processing unit 130.

The data correction processing unit 130 stores the digital data for one line outputted from the A/D converter 110 in the storage unit 140.

FIG. 8 illustrates the timing of a shift pulse outputted by the reading controller 120 at the step S104 described above (timing to start sensor reading) by the use of the example shown as Ex. 1 in FIG. 6C. Incidentally, the correction α of the offset correction is omitted.

For reading control on the first line, e.g., the reading controller 120 determines a dummy interval so that the noise peak position comes to the first one of the five intervals into which the noise period is divided at the step S101. As shown there, the reading controller 120 provides the image sensor 220 with a shift pulse at reference timing (synchronized with the reference shift period) without changing the timing to start sensor reading. In case of an offset correction, although not shown, the reading controller 120 provides the image sensor 220 with a shift pulse at timing later than the reference timing by the correction α determined at the step S102, as a matter of course.

Further, for reading control on the second line, the reading controller 120 determines a dummy interval so that the noise peak position comes to the fourth one of the five intervals into which the noise period is divided at the step S101. Thus, as shown there, the reading controller 120 provides the image sensor 220 with a shift pulse at timing later than the reference timing (synchronized with the reference shift period) by two of the five intervals into which the noise period is divided (plus the correction α determined at the step S102 in case of an offset correction).

Further, for reading control on the third line, the reading controller 120 determines a dummy interval so that the noise peak position comes to the second one of the five intervals into which the noise period is divided at the step S101. Thus, as shown there, the reading controller 120 provides the image sensor 220 with a shift pulse at timing later than the reference timing (synchronized with the reference shift period) by four of the five intervals into which the noise period is divided (plus the correction a determined at the step S102 in case of an offset correction).

Further, for reading control on the fourth line, the reading controller 120 determines a dummy interval so that the noise peak position comes to the fifth one of the intervals into which the noise period is divided at the step S101. Thus, as shown there, the reading controller 120 provides the image sensor 220 with a shift pulse at timing later than the reference timing (synchronized with the reference shift period) by one of the five intervals into which the noise period is divided (plus the correction a determined at the step S102 in case of an offset correction).

Further, for reading control on the fifth line, the reading controller 120 determines a dummy interval so that the noise peak position comes to the third one of the intervals into which the noise period is divided at the step S101. Thus, as shown there, the reading controller 120 provides the image sensor 220 with a shift pulse at timing later than the reference timing (synchronized with the reference shift period) by three of the five intervals into which the noise period is divided (plus the correction a determined at the step S102 in case of an offset correction).

Incidentally, in order that the noise peak position comes to the k-th one of the n-intervals into which the noise period is divided, the reading controller 120 determines that the dummy interval equals "n−k+1" intervals.

Figure 9:
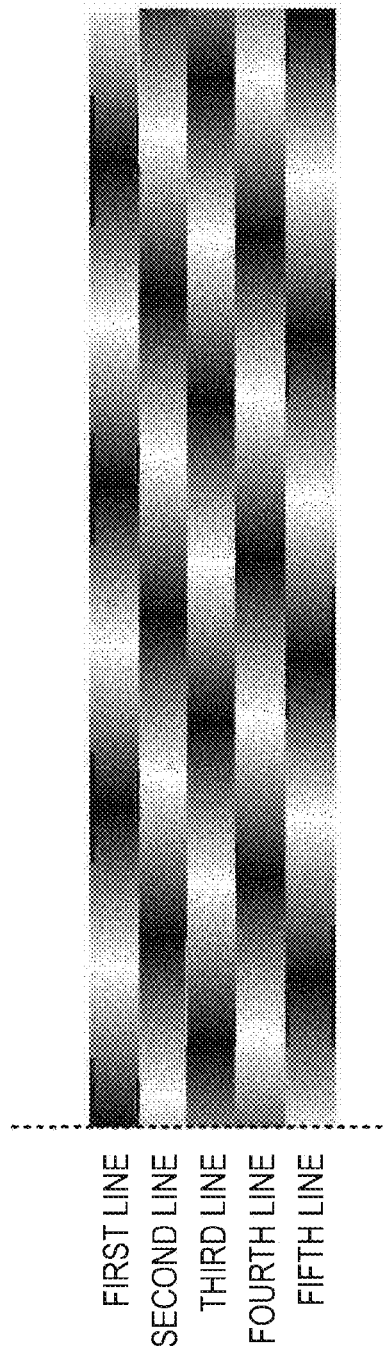
FIG. 9 illustrates intensity of noise overlaid on first to fifth lines in a case where an image is read by means of image reading control shown in FIG. 8.

FIG. 9 illustrates intensity of noise overlaid on the first to fifth lines in a case where an image is read by means of the reading control shown in FIG. 8. The intensity of the noise is indicated by light and shade in black. In the image data read by means of the reading control shown in FIG. 8, as shown there, peak positions of the noise overlaid on the respective lines are uneven, and the noise draws not as much attention as usual.

Incidentally, upon finishing the reading control for one line, the reading controller 120 shifts the process to a step S105. Then, the reading controller 120 identifies whether all lines included in the image data to be processed are read (step S105).

If all the lines are not read yet (step S105; No), the reading controller 120 returns the process to the step S104, and repeats the process at the step S104 until all the lines are read.

Meanwhile, if all the lines are read (step S105; Yes), the reading controller 120 ends the flow. After the flow ends, the data correction processing unit 130 corrects the image data stored in the storage unit 140 in various ways such as shading correction, and outputs the corrected data to the output unit 150. Then, the output unit 150 transmits the variously corrected digital data to the host computer.

The image reading device 50 of the embodiment can read image data which draws not as much attention as usual by carrying out the image reading process described above.

Incidentally, every process unit of the flow described above is one of parts into which the flow is divided in accordance with what is mainly processed so that the image reading device 50 can be easily understood. The invention is not limited depending upon how the processing steps are classified or what the processing steps are named. The process carried out by the image reading device 50 can be divided into further more processing steps. Further, one of the processing steps can include further more processes.

Further, it is intended that the above embodiment exemplifies scope of the invention, and the above embodiment does not limit the invention. Lots of alternatives, variations and modifications are obvious to a person ordinarily skilled in the art.

An image reading process for reading, e.g., a color image will be explained below.

<Image Reading Process (Color Image)>

In order to read a color image, the reading controller 120 provides the image sensor 220 with a shift pulse not for every line but for every RGB color. Thus, the reading controller 120 determines a dummy interval and an offset correction α for every RGB color as well.

At the step S101, e.g., the reading controller 120 divides a noise period into a plurality of intervals for every RGB color. Then, the reading controller 120 arranges, in a same color, that intervals in which noise peak (or bottom) positions are included differ from one another on respective lines formed by the consecutive intervals into which the noise period is divided. The reading controller 120 arranges that intervals in which noise peak (or bottom) positions are included differ from one another between lines of different colors, as well.

Figure 10:
FIG. 10 illustrates noise peak positions on respective lines in a case where the noise period is divided into five intervals for every RGB color.

FIG. 10 shows, for every RGB color, noise peak positions on respective lines in a case where a noise period is divided into five intervals. Incidentally, an interval including a noise peak position is indicated by a bold rectangle.

In order to read an R-image, as shown in FIG. 10, the reading controller 120 arranges that the intervals in which noise peak positions are included differ from one another on consecutive five lines in the red color. In order to read a first one of the five consecutive lines, the reading controller 120 determines a dummy interval so that a noise peak position comes to a first one of the intervals into which the noise period is divided by five. Further, in order to read a second one of the five consecutive lines, the reading controller 120 determines a dummy interval so that a noise peak position comes to a fourth one of the intervals into which the noise period is divided by five. Further, in order to read a third one of the five consecutive lines, the reading controller 120 determines a dummy interval so that a noise peak position comes to a second one of the intervals into which the noise period is divided by five. Further, in order to read a fourth one of the five consecutive lines, the reading controller 120 determines a dummy interval so that a noise peak position comes to a fifth one of the intervals into which the noise period is divided by five. Further, in order to read a fifth one of the five consecutive lines, the reading controller 120 determines a dummy interval so that a noise peak position comes to a third one of the intervals into which the noise period is divided by five.

Further, in order to read a G-image, the reading controller 120 arranges that the intervals in which noise peak positions are included differ from one another on consecutive five lines in the green color. The reading controller 120 arranges that the intervals in which noise peak positions are included differ from each other between corresponding lines of the G- and R-images, as well. In order to read a first one of the five consecutive lines, e.g., the reading controller 120 determines a dummy interval so that a noise peak position comes to a third one of the intervals into which the noise period is divided by five. It is determined in such a way that the noise peak positions differ from each other between the first line of the R-image and the first line of the G-image. In order to read a second one of the five consecutive lines, further, the reading controller 120 determines a dummy interval so that a noise peak position comes to a fifth one of the intervals into which the noise period is divided by five. It is determined in such a way that the noise peak positions differ from each other between the second line of the R-image and the second line of the G-image. In order to read a third one of the five consecutive lines, further, the reading controller 120 determines a dummy interval so that a noise peak position comes to a second one of the intervals into which the noise period is divided by five, resulting in that the noise peak positions agree with each other between the third lines of the R- and G-images. Although the reading controller 120 should primarily arrange that the intervals in which noise peak positions are included unexceptionally differ from each other between corresponding lines of different colors, an exception is allowed if impossible. In such a case, the reading controller 120 determines a dummy interval in such a way that the noise peak position on the third line of the B-image described later disagrees with the noise peak positions on the third lines of the R- and G-images. In order to read a fourth one of the five consecutive lines, further, the reading controller 120 determines a dummy interval so that a noise peak position comes to a fourth one of the intervals into which the noise period is divided by five. It is determined in such a way that the noise peak positions differ from each other between the fourth line of the R-image and the fourth line of the G-image. In order to read a fifth one of the five consecutive lines, further, the reading controller 120 determines a dummy interval so that a noise peak position comes to a first one of the intervals into which the noise period is divided by five. It is determined in such a way that the noise peak positions differ from each other between the fifth line of the R-image and the fifth line of the G-image.

Further, in order to read a B-image, the reading controller 120 arranges that the intervals in which noise peak positions are included differ from one another on consecutive five lines in the blue color. The reading controller 120 arranges that the intervals in which noise peak positions are included differ from each other between corresponding lines of the B- and each of R- and G-images, as well. In order to read a first one of the five consecutive lines, e.g., the reading controller 120 determines a dummy interval so that a noise peak position comes to a fourth one of the intervals into which the noise period is divided by five. It is determined in such a way that the noise peak positions differ from one another on all the first lines of the R-, G- and B-images. In order to read a second one of the five consecutive lines, further, the reading controller 120 determines a dummy interval so that a noise peak position comes to a second one of the intervals into which the noise period is divided by five. It is determined in such a way that the noise peak positions differ from one another on all the second lines of the R-, G- and B-images. In order to read a third one of the five consecutive lines, further, the reading controller 120 determines a dummy interval so that a noise peak position comes to a fifth one of the intervals into which the noise period is divided by five. It is determined in such a way that the noise peak positions of the R- and G-images, which agree with each other on the third lines as mentioned earlier, differ from the noise peak position of the B-image though. In order to read a fourth one of the five consecutive lines, further, the reading controller 120 determines a dummy interval so that a noise peak position comes to a third one of the intervals into which the noise period is divided by five. It is determined in such a way that the noise peak positions differ from one another on all the fourth lines of the R-, G- and B-images. In order to read a fifth one of the five consecutive lines, further, the reading controller 120 determines a dummy interval so that a noise peak position comes to a first one of the intervals into which the noise period is divided by five. It is determined in such a way that the noise peak positions differ from each other between the fifth lines of the R- and B-images, although resulting in that the noise peak positions agree with each other between the fifth lines of the G- and B-images. The reading controller 120 should primarily arrange that the intervals in which noise peak positions are included unexceptionally differ from each other between corresponding lines of different colors as to the fifth lines as well, an exception is allowed if impossible.

Then, the reading controller 120 carries out the offset correction described above for every RGB color at the step S102.

Then, at the step S103, the reading controller 120 adds the dummy interval determined for every color at the step S101 to the offset correction α determined for every color at the step S102 so as to determine a position to start sensor reading for every color.

Further, at the step S104, the reading controller 120 controls document reading in accordance with the position to start sensor reading determined for every color at the step S103. The reading controller 120 specifically provides the image sensor 220 with a shift pulse at the position (timing) to start sensor reading determined for every color at the step S103.

In order to read a color image, the reading controller 120 emits light of each of RGB three colors in specific order for a specific period of time as a matter of course.

Figure 11:
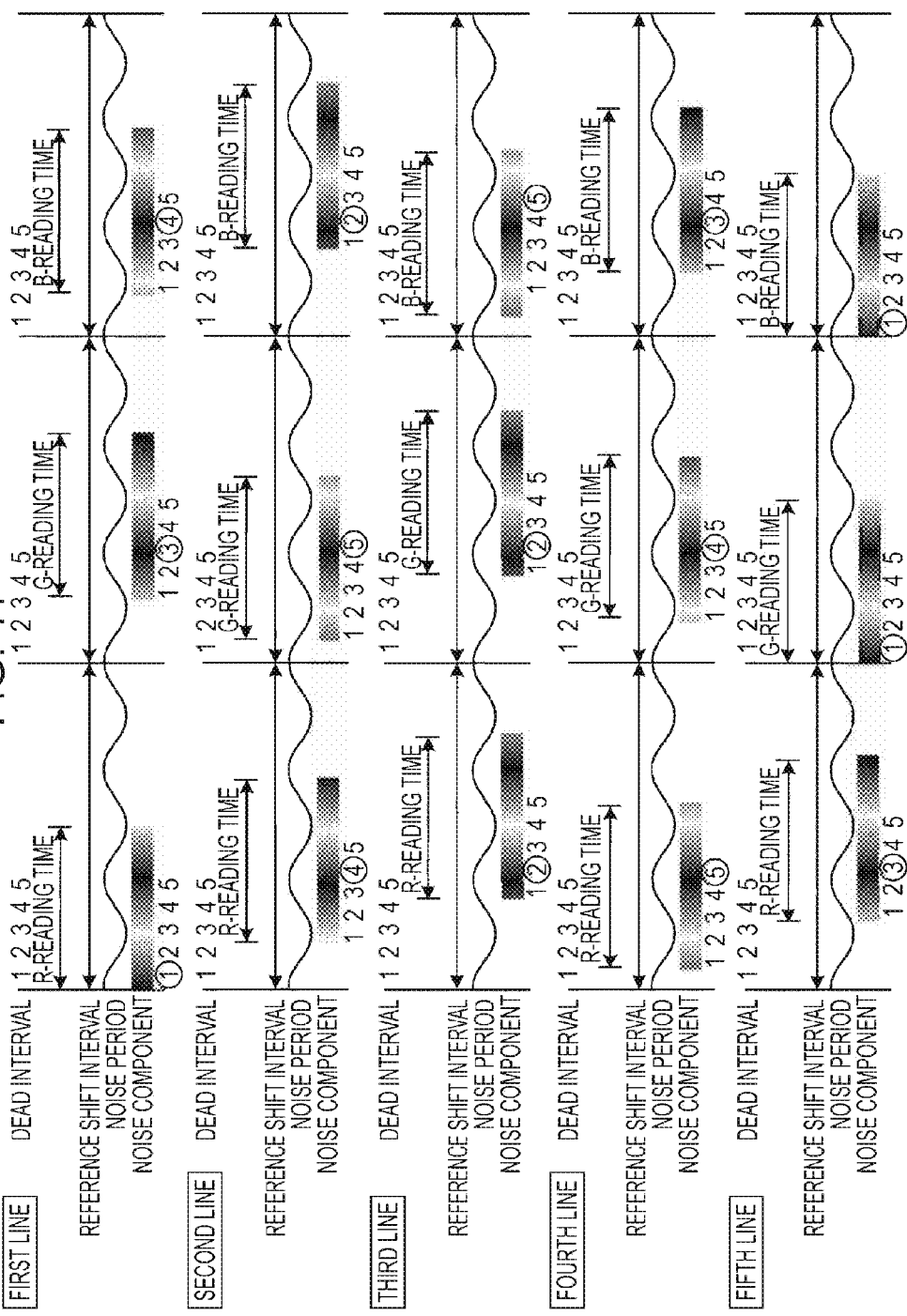
FIG. 11 illustrates timing of a shift pulse outputted by the reading controller at the step S104 in a case where a color image is read.

FIG. 11 illustrates the timing of a shift pulse outputted by the reading controller 120 at the step S104 in order that a color image is read by the use of the example shown in FIG. 10. Incidentally, the correction α of the offset correction is omitted.

For reading control on the first line, e.g., the reading controller 120 determines a dummy interval for the R-image so that the noise peak position comes to the first one of the five intervals into which the noise period is divided at the step S101. Thus, in order to read the R-image, as shown there, the reading controller 120 provides the image sensor 220 with a shift pulse at the reference timing (synchronized with the reference shift period) without changing the timing to start sensor reading. In case of an offset correction, although not shown, the reading controller 120 provides the image sensor 220 with a shift pulse at timing later than the reference timing by the correction α determined at the step S102, as a matter of course.

As to the G-image (first line), further, the reading controller 120 determines a dummy interval so that the noise peak position comes to the third one of the five intervals into which the noise period is divided at the step S101. Thus, in order to read the G-image, as shown there, the reading controller 120 provides the image sensor 220 with a shift pulse at timing later than the reference timing (synchronized with the reference shift period) by three of the five intervals into which the noise period is divided (plus the correction α determined at the step S102 in case of an offset correction).

As to the B-image (first line), further, the reading controller 120 determines a dummy interval so that the noise peak position comes to the fourth one of the five intervals into which the noise period is divided at the step S101. Thus, in order to read the G-image, as shown there, the reading controller 120 provides the image sensor 220 with a shift pulse at timing later than the reference timing (synchronized with the reference shift period) by two of the five intervals into which the noise period is divided (plus the correction α determined at the step S102 in case of an offset correction).

Incidentally, in order that the noise peak position comes to the k-th one of the n-intervals into which the noise period is divided, the reading controller 120 determines that the dummy interval equals "n−k+1" intervals similarly as in the monochrome image case.

As to each of the following second, third, fourth and fifth lines, the reading controller 120 similarly changes the timing of a shift pulse being provided to the image sensor 220, as shown in FIG. 11 in detail.

The reading controller 120 of the application can read image data in which noise draws not as much attention as usual in case of reading a color image, as well, by modifying the image reading process of the embodiment described above.

FIG. 12 illustrates intensity of noise overlaid on the first to fifth lines for every color in a color image read by means of the above modification. The intensity of the noise is indicated by light and shade in black. In the color image read by means of the above modification, as shown there, peak positions of the noise overlaid on the respective lines of the same color are uneven in all of the R-, G- and B-images, and the peak positions of the noise overlaid on the corresponding lines of different colors disagree with each other (excluding the exceptions), so that the noise draws not as much attention as usual.

According to the embodiments described above, the reading controller 120 inserts a fixed dummy interval into a shift period for every line or for every color, to which the invention is not limited though. The reading controller 120, e.g., randomly determines a length of a dummy interval to be inserted into a shift period for every line or for every color (i.e., for every insertion), and provides the image sensor 220 with a shift pulse at timing later than the reference timing (synchronized with the reference shift period) by the randomly determined dummy interval (plus the correction α determined at the step S102 in case of an offset correction).

Incidentally, it is assumed that the noise period or the reference shift period described above is stored in a storage device not shown in advance, and that the reading controller 120 suitably reads the noise period or the reference shift period from the storage device so as to carry out the various arithmetic operations described above, although not explained as to the above embodiments.

What is claimed is:

1. An image reading device comprising:
   a light source;
   an image sensor configured to transfer an electric charge accumulated on an opto-electric conversion element to a shift register through a shift gate; and
   a reading controller configured to shift timing to start sensor reading on every line by inserting a dummy interval into a shift period for which the electric charge is transferred from the opto-electric conversion element, so as to arrange that a plurality of peak positions of noise included in a read image differ from one another on the respective lines by adjusting a timing of when the dummy interval is inserted into the shift period of the respective lines, wherein the dummy interval inserted in each line of the read image is at a different timing position than the dummy interval inserted in the next consecutive line of the read image, and
   wherein the reading controller:
      divides a period of one cycle of the noise into N (N is an integer, where N>=2) intervals;
      sums M (M is an integer, where 0<=M<=N−1) of the N intervals into which the period of one cycle of the noise is divided up to the dummy interval; and
      sets the number M for every consecutive line differently from one another.

2. The image reading device according to claim 1, wherein the reading controller:
   sets the integer M for every consecutive line of a same color differently from one another in order to read a color image; and
   sets the integer M differently for at least one of different colors between corresponding lines of the different colors.

3. The image reading device according to claim 1, wherein the integer N is five.

4. The image reading device according to claim 1, wherein the reading controller randomly determines a length of the dummy interval every time the dummy interval is inserted.

5. The image reading device according to claim 1, wherein the reading controller corrects timing for sensor reading on every line to timing of a same phase of the noise.

6. A method for reading an image by means of an image reading device having a light source and an image sensor configured to transfer an electric charge accumulated on an opto-electric conversion element to a shift register through a shift gate, the method comprising:
   a reading control step for shifting timing to start sensor reading on every line by inserting a dummy interval into a shift period for which the electric charge is transferred from the opto-electric conversion element, so as to arrange that a plurality of peak positions of noise included in a read image differ from one another on the respective lines by adjusting a timing of when the dummy interval is inserted into the shift period of the respective lines, wherein the dummy interval inserted in each line of the read image is at a different timing position than the dummy interval inserted in the next consecutive line of the read image, and wherein the reading control includes:
   dividing a period of one cycle of the noise into N (N is an integer, where $N>=2$) intervals;
   summing M (M is an integer, where $0<=M<=N-1$) of the N intervals into which the period of one cycle of the noise is divided up to the dummy interval; and
   setting the number M for every consecutive line differently from one another; and
   a reading step for carrying out sensor reading on the timing shifted on every line at the reading control step.

* * * * *